No. 643,784. Patented Feb. 20, 1900.
H. H. WABERS.
HAND PLANTER.
(Application filed Oct. 12, 1899.)
(No Model.)
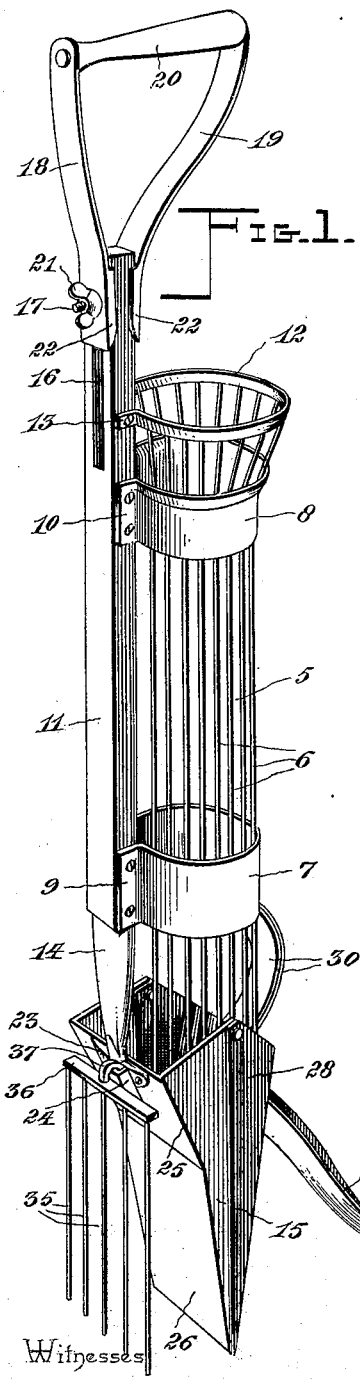
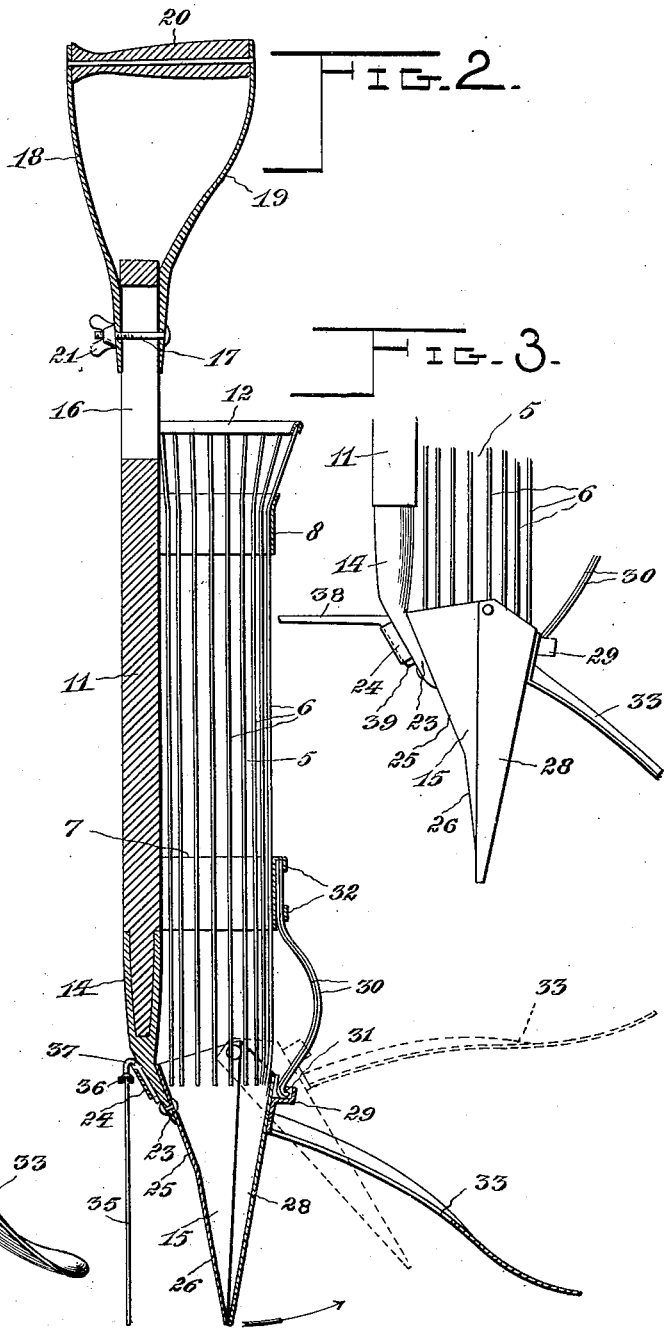
Witnesses
John T. Deukermid
Geo. H. Chandlee
Henry H. Wabers, Inventor
By his Attorneys,
C. A. Snow & Co.
THE NORRIS PETERS CO., PHOTO-LITHO., WASHINGTON, D. C.

UNITED STATES PATENT OFFICE.

HENRY H. WABERS, OF WAUTOMA, WISCONSIN, ASSIGNOR OF ONE-HALF TO MICHAEL J. SOENS, OF RACINE, WISCONSIN.

HAND-PLANTER.

SPECIFICATION forming part of Letters Patent No. 643,784, dated February 20, 1900.

Application filed October 12, 1899. Serial No. 733,394. (No model.)

*To all whom it may concern:*

Be it known that I, HENRY H. WABERS, a citizen of the United States, residing at Wautoma, in the county of Waushara and State of Wisconsin, have invented a new and useful Hand-Planter, of which the following is a specification.

This invention relates to that class of devices commonly known as "hand-planters," and more particularly to those adapted for use in planting potatoes, and has for its object to provide a construction in which the potatoes may be quickly and efficiently planted and in which, moreover, the removal of the planter from its operative position will act to cover the potato last planted.

In the drawings forming a portion of this specification, and in which like numerals of reference indicate similar parts in the several views, Figure 1 is a perspective view showing the complete apparatus with the coverer in place. Fig. 2 is a longitudinal central section taken through both jaws and the coverer. Fig. 3 is a detail side elevation showing the lower end of the device with a foot-rest substituted for the coverer.

Referring now to the drawings, 5 represents the potato or other seed-receiving hopper, which is preferably cylindrical in shape with a flaring upper end. This hopper is formed with a plurality of mutually-parallel rods or bars 6, connected at a point above their lower ends by a substantially circular band 7 and at a point below the flared upper end by a similar upper band 8, these bands having their ends turned outwardly, as shown at 9 and 10, to form ears, between which is held a handle 11. A third band 12 is secured to the upper ends of the rods 6 and has its ends 13 also fixed to the handle 11. The handle 11 extends a little more than two-thirds of the way down the length of the hopper and is received at its lower end in a tube 14, which forms a means of connection between it and a fixed jaw 15, hereinafter described.

At the upper end of the handle 11 is formed a longitudinal slot 16, extending from the front to the rear of the handle. Passed through this slot 16 is a bolt 17, which acts to rigidly secure the lower ends of the arms 18 and 19 of a handhold 20. These arms 18 and 19 diverge upwardly, the arm 19 extending outwardly and over the hopper 5, while the arm 18 extends at a slighter distance beyond the opposite or rear side of the handle. Alining perforations are formed through the lower portions of these arms, through which the bolt 17 is passed and with respect to which and the handle 11 the arms are firmly held by means of a thumb-nut 21. It will be noted that the arm 18 is somewhat shorter than the arm 19 to compensate for the difference in the extensions of the arms beyond the handle. In order to further hold the arms rigidly with respect to the handle, that portion of each arm adjacent the handle is provided with flanges 22 at their side edges and which lie upon the side faces of the handle.

The tube 14 is firmly secured to the jaw 15 through the medium of a plate 23, preferably formed integral with the tube and riveted to the jaw, and this plate carries a socket 24 for a purpose which will be presently explained. This jaw 15, moreover, comprises an upper inclined portion 25, upon which the potatoes or other seed fall from the hopper, and said jaw comprises also a lower projecting lip 26, adapted to receive the matter from the portion 25 and direct it to the earth, and which portion 26, moreover, is adapted to be forced into the ground.

Pivotally connected with the jaw 15 is a second and scoop-shaped jaw 28, adapted for movement upon its pivot toward and away from the jaw 15. This movable jaw 28 has a box-shaped seat or socket 29, adapted to receive the lower end of a bow-spring 30, and which end is curved, as shown at 31, to permit movement of the spring within the socket. This spring may consist of two plates, as shown, and the opposite end of the spring is held beneath clips 32 upon the outer surface of the bands 7. The object of this spring is to hold the jaw 28 in yieldable engagement with the jaw 15 and to permit its movement therefrom for the passage of the potatoes or other seed between them and into the earth.

Fixed at one end to the jaw 28 is an outwardly and downwardly extending foot 33, the lower end of which is in a position to engage the surface of the earth during the operation of the machine and to arrest the downward progress of the implement, so that its continued downward progress will act to move the jaw 28 upon its pivot away from the jaw 15.

A coverer, consisting of a plurality of tangs 35, fixed to a back 36, is provided with a shank 37, adapted to enter the socket 24, and thus to hold the coverer, with its tangs, parallel with the handle 11, and adapted for interchangeable connection with the socket is a foot-rest 38, having a shank 39 adapted to enter the socket, as shown in Fig. 3 of the drawings. Thus it will be seen that when desired the coverer and rest may be substituted one for the other to permit the best employment of the device under different conditions.

With the coverer in place the operation of the device is as follows: The potato or other seed is dropped into the hopper and falls upon the plate 25 and thence passes to a position between the lower portions of the jaws. The implement is then manipulated to force the lower ends of the jaws into the ground, and after they have entered approximately one and one-half inches the foot 33 strikes the surface of the ground and a further movement forces the jaws apart, the coverer moving with the jaw 15 away from the jaw 28. When the potato has passed from between the jaws, the implement is rocked with its upper end in the direction of the foot, after which it is returned and raised, assisted by the spring 30, when the return movement of the coverer will act to move the loose dirt in the direction of movement of the lower end of the implement, and thus to cover the potatoes or seeds planted.

If the earth be hard or stiff and not easily pierced with the jaws, the foot-rest 38 may be substituted for the coverer and will then afford a means for pressing the implement well down into the ground.

When the implement is raised from the ground, the parts will assume their normal position, (shown in Fig. 1 of the drawings,) and the interchange of the coverer and foot-rest may be quickly performed.

While the hopper is shown of strips or bars having mutual connection, it will of course be understood that it may be formed in any other manner that will permit a sight of the seed or potatoes during the planting operation. It will also be understood that other portions of this structure may be varied in form, proportion, and material without departing from the spirit of the invention.

Having thus described the invention, what is claimed as new is—

1. In a hand-planter, the combination with a hopper, of a jaw rigidly fixed thereto and movable therewith, a second jaw pivoted with respect to the hopper and the first-named jaw, and a coverer rigidly connected to the first-named jaw and movable therewith to cover the planted seed.

2. In a hand-planter, the combination with a hopper having a jaw rigidly fixed thereto and movable therewith, of a handle fixed to the hopper, a second jaw pivotally connected with the first-named jaw, a foot fixed to the pivoted jaw and adapted to engage the earth to move the pivoted jaw, and a coverer rigidly connected to the first-named jaw and movable therewith to cover the planted seed.

3. In a hand-planter, the combination with a longitudinally-slotted hopper having a handle fixed thereto, of a jaw rigidly fixed to the handle and movable therewith, a second jaw pivoted to the first-named jaw and movable with respect thereto, means for moving the pivoted jaw, and a coverer rigidly and removably connected with the fixed jaw and movable therewith to cover the planted seed.

4. In a hand-planter, the combination with a hopper having a handle fixed thereto, of fixed and movable jaws at the lower end of the hopper, the fixed jaw being adapted to receive interchangeably a foot-piece and a coverer.

5. A hand-planter comprising a hopper having a handle fixed thereto and provided with a handhold extending above and over the hopper, a jaw fixed to the handle, a second jaw pivoted to the first-named jaw and having an operating-foot, a seat upon the pivoted jaw, a spring connected with the hopper and entering the seat and adapted to hold the jaws normally in rigid engagement, and a coverer removably connected with the fixed jaw.

In testimony that I claim the foregoing as my own I have hereto affixed my signature in the presence of two witnesses.

HENRY H. WABERS.

Witnesses:
GEO. B. HEANEY,
JOHN C. FAIRWEATHER.